United States Patent [19]

Ishizuka

[11] Patent Number: 4,822,097
[45] Date of Patent: Apr. 18, 1989

[54] VEHICLE ROOF STRUCTURE HAVING SLIDING ROOF LID

[75] Inventor: Satoshi Ishizuka, Tokyo, Japan

[73] Assignee: Nissan Motor Co., Ltd., Yokohama, Japan

[21] Appl. No.: 94,613

[22] Filed: Sep. 9, 1987

[30] Foreign Application Priority Data

Sep. 9, 1986 [JP] Japan ................. 61-212369

[51] Int. Cl.$^4$ ............................. B60J 7/047; B60J 7/19
[52] U.S. Cl. ..................................... 296/216; 296/220; 296/224
[58] Field of Search ................. 296/216, 220, 223, 224

[56] References Cited

U.S. PATENT DOCUMENTS

| | | | |
|---|---|---|---|
| 4,630,860 | 12/1986 | Fuerst et al. | 296/217 |
| 4,647,106 | 3/1987 | Furst | 296/223 |
| 4,671,565 | 6/1987 | Grimm et al. | 296/216 |

FOREIGN PATENT DOCUMENTS

| | | | |
|---|---|---|---|
| 3640168 | 6/1987 | Fed. Rep. of Germany | 296/216 |
| 59-6127 | 1/1984 | Japan | |
| 60-219121 | 1/1985 | Japan | |
| 60-163723 | 8/1985 | Japan | |

*Primary Examiner*—Dennis H. Pedder
*Attorney, Agent, or Firm*—Foley & Lardner, Schwartz, Jeffery, Schwaab, Mack, Blumenthal & Evans

[57] ABSTRACT

In a vehicle roof structure having a sliding roof lid which is supported on a stationary roof frame through a support member fixed to the underside of the lid so that the lid can be opened by tilting the lid and sliding the lid rearwardly over the roof, there is provided a cam mechanism for tilting the lid by receiving a rearward motion of a drive slider which is slidably mounted on a rail member and driven back and forth by a motor. The cam mechanism includes a cam slot which is formed in the support member and inclined with respect to the rail member, and a tilt pin which is formed in the drive slider and slidably received in the cam slot. The rail member has a first rail groove extending along the rail member and a recess depressed below the first rail groove. The support member has a front main portion which is fixed to an underside of a front portion of the lid and formed with the cam slot, and a rear extension extending from the front main portion to a rear end of the support member toward a rear end of the lid. The front main portion of the support member having a front sliding portion slidably received in the first rail groove of the rail member, and a rear sliding portion slidably received in the first rail groove when the support member slides along the rail member. The rear sliding portion being sunk in the recess and the rear end of the support member being received in the first rail grooves when the support member is in the closed position.

15 Claims, 6 Drawing Sheets

VEHICLE ROOF STRUCTURE HAVING SLIDING ROOF LID

BACKGROUND OF THE INVENTION

The present invention relates to a vehicle roof structure having a sliding roof lid which can be tilted up and slid to an open position in which the lid in a tilted posture is placed over the roof.

FIGS. 17-22 show three conventional examples (which are disclosed in Japanee patent provisional publications Nos. 59-6127, 60-163723 and 60-219121, for example).

Figure 17:
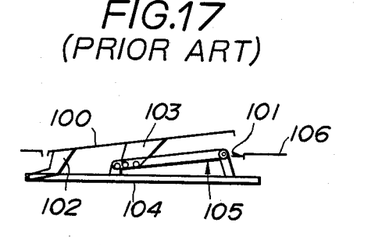
FIGS. 17 and 18 are schematic side views showing a first conventional sliding roof structure.
Figure 18:
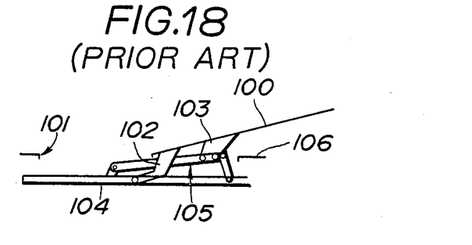

In the example shown in FIGS. 17 and 18, a roof lid 100 for a roof opening 101 is slidably supported through first and second support members 102 and 103 on a stationary rail 104. The second support member 103 is supported on the rail 104 through a linkage 15 for tilting up the lid. The lid 100 can be opened by lifting up the rear end of the lid 100 by a drive wire (not shown) through the linkage 105, and sliding the second support member 103 to an open position in which the lid 100 is placed above a rear roof 106.

Figure 19:
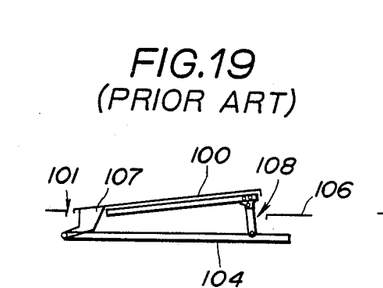
FIGS. 19 and 20 are schematic side views showing a second conventional sliding roof structure.
Figure 20:
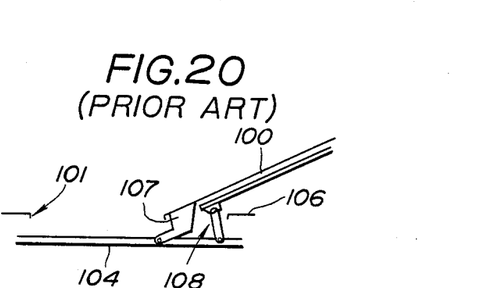

In the example shown in FIGS. 19 and 20, the front end of the lid 100 is supported through a support member 107 on the rail 104, and the rear end of the lid 100 is supported through a linkage 108 on the rail 104. The lid 100 of this example is opened by moving the linkage 108 to tilt up the lid 100, and then causing the support member 107 to slide.

Figure 21:
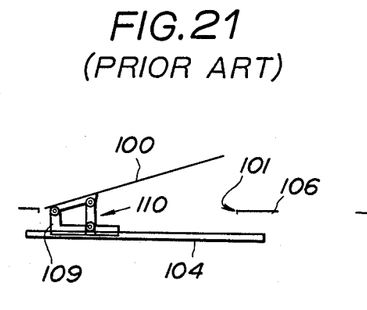
FIGS. 21 and 22 are schematic side views showing a third conventional sliding roof structure.
Figure 22:
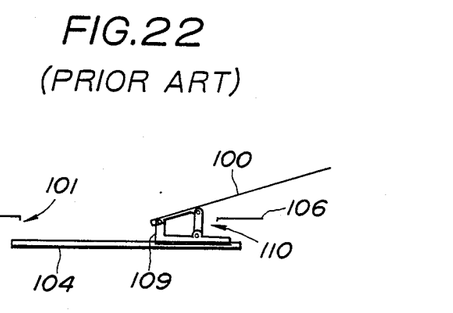

In the example shown in FIGS. 21 and 22, the lid 100 is supported through a support member 109 on the rail 104, and there is futher provided a linkage 110 for tilting up the lid 100.

However, each of these conventional examples uses the linkage 105, 108 or 110 for the tilting operation, so that the looseness of each joint of the linkage 105, 108 or 110 is added to the looseness of the portion connecting each support member 102, 103, 107 or 109 with the rail 104. Therefore, the mechanism for supporting the lid 100 according to each conventional example is disadvantageous in that its looseness is increased, and its rigidity is low especially during the tilting operation. Moreover, the looseness of the mechanism is further increased because each link of the linkage 105, 108 or 110 must be made long in order to prevent interference between the lid 100 and the rear roof 106 by increasing a tilt angle of the lid 100.

SUMMARY OF THE INVENTION

It is an object of the present invention to provide a vehicle roof structure having a roof lid supporting mechanism which is exempt from looseness, and rigid even during a tilting operation.

According to the present invention, a vehicle roof structure comprises a roof frame having a roof opening, a sliding roof lid for closing the roof opening when the lid is in a closed position and for opening the roof opening when the lid is in an open position, a rail member fixed to the frame, a support member fixed to the lid and slidably mounted on the rail so that the lid can be tilted up and slid in a tilted posture along the rail member to the open position in which the lid is laid over the frame, a drive slider slidably mounted on the rail member for tilting and sliding the lid, and a cam means which comprises a cam slot formed in the support member, and a translating means formed in the drive slider and slidably received in the cam slot for causing the support member to tilt with respect to the rail member by sliding along the cam slot when the translating means is moved along the rail member with the drive slider.

DETAILED DESCRIPTION OF THE INVENTION

One embodiment of the present invention is shown in FIGS. 1-16.

A vehicle of this example has left and right mechanisms, respectively, supporting left and right sides of a roof lid 1 for an opening 2 formed in a roof of the vehicle. FIGS. 1-4 show only one of the left and right mechanisms.

Each mechanism includes a support member 3 fixed to the underside of the roof lid 1, and a rail member 4 fixed to the stationary frame of the vehicle roof. The roof lid 1 is slidably supported on the rail member 4 through the support member 3 on each of the left and right sides. The left and right rail members 4 of the left and right mechanisms extend generally along a longitudinal line of the vehicle, in parallel to each other on the left and right sides of the roof opening 2.

The support member 3 of each mechanism has a front main portion 31 fixed to a front portion of the roof lid 1, and a rear portion 32 extending from the front main portion 31 along the underside of the roof lid 1 toward the rear end of the roof lid 1. The front portion 31 has a front lower end formed with a front sliding portion 33 and a rear lower end formed with a rear sliding portion 34. The front and rear sliding portions 33 and 34 formed in the front portion of the support member 3 are slidably received in a first rail groove 41 formed in the rail member 4.

Figure 5:
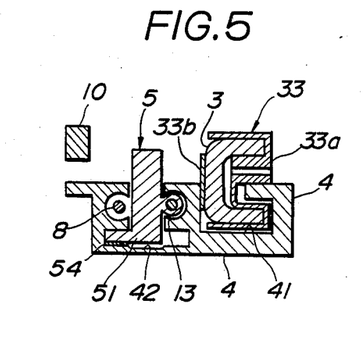
FIG. 5 is an enlarged sectional view taken across a line V—V of FIG. 1.
Figure 9:
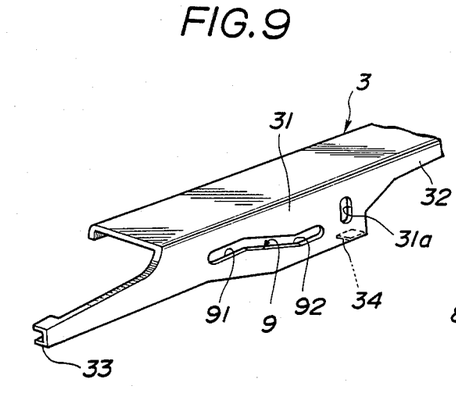
FIG. 9 is a schematic perspective view showing a main portion of a support member shown in FIG. 1.

As shown in FIGS. 5 and 9, the front sliding portion 33 of the support member 3 of each mechanism has a C-shaped section, and the first rail groove 41 is shaped to prevent the front sliding portion 33 from derailing due to an upper flange portion of rail member 4. A sliding surface of the front sliding portion 33 is covered with a liner 33a for reducing friction, as shown in FIG. 5. A side surface of the front sliding portion 33 is covered with a spacer 33b for eliminating looseness in the lateral direction of the vehicle between the first rail groove 41 and the front sliding portion 33.

Figure 7:
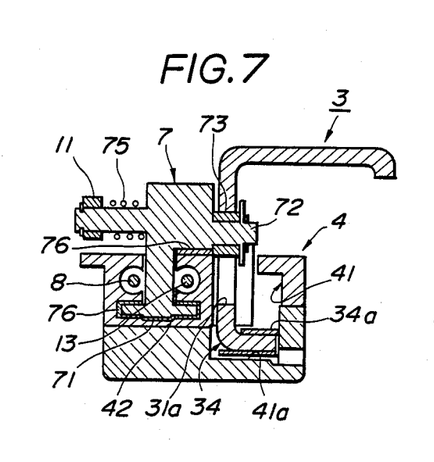
FIG. 7 is an enlarged sectional view taken across a line VII—VII of FIG. 1.
Figure 8:
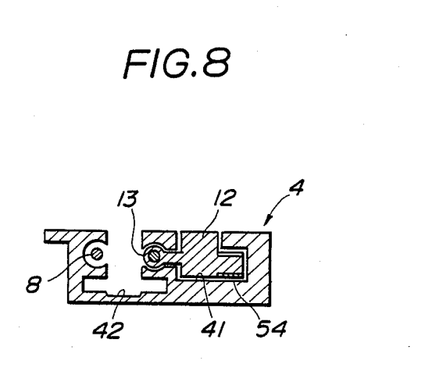
FIG. 8 is an enlarged sectional view taken across a line VIII—VIII of FIG. 1.

As shown in FIGS. 7 and 9, the rear sliding portion 34 of the support member 3 of each mechanism has an L-shaped section. A sliding surface of the rear sliding portion 34 is covered with a liner 34a. When the roof lid 1 is in a closed position shown in FIGS. 1, the rear sliding portion 34 is received in a recess 41a formed under the first rail groove 41. The rear sliding portion 34 is drawn up from the recess 41a to the height of the first groove 41 when the roof lid 1 is tilted up from the closed position, and the rear sliding portion 34 slides in the first rail groove 41 when the roof lid 1 is slid toward the rear of the vehicle.

The rail member 4 of each mechanism of this embodiment is inclined at a predetermined angle with respect to the roof surface which is substantially horizontal in this example, in such a manner that the rail member 4 slopes down from a rear end to a front end. When the roof lid 1 is in the closed position shown in FIG. 1, a rear end 32a of the rear portion 32 of the support member 3 is received in the first rail groove 41. The rail member 4 is further formed with a second rail groove 42 parallel to the first rail groove 41. A front slider 5, a drive slider 6 and a rear slider 7 are slidably received in the second rail groove 42.

Among the three sliders, the front slider 5 is always foremost and closest to the front end of the rail member 4, and the rear slider 7 is always rearmost. The drive slider 6 is always between the front slider 5 and the rear slider 7.

Figure 6:
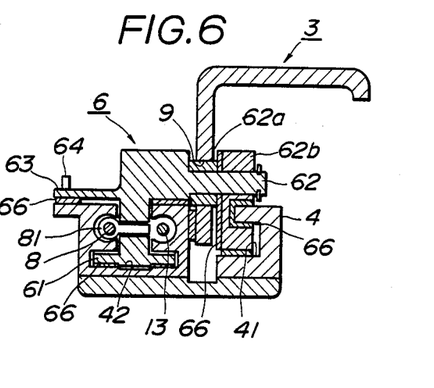
FIG. 6 is an enlarged sectional view taken across a line VI—VI of FIG. 1.
Figure 10:
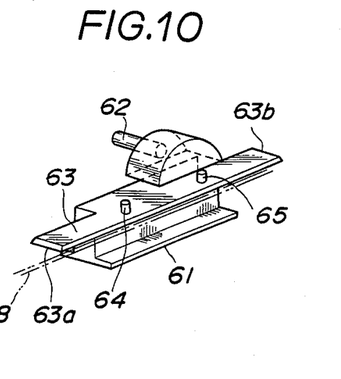
FIG. 10 is a schematic perspective view showing a main portion of a drive slider shown in FIG. 1.

As shown in FIG. 6, the drive slider 6 has a lower portion 61 received in the second rail groove 42. The drive slider 6 is connected with a driving motor (not shown) by a wire 8 which is fixed to an outer side surface of the drive slider 6 by staking through a staking member 81. A tilt pin 62 projects from an inner side surface of the drive slider 6 which faces toward the first rail groove 41. The tilt pin 62 of the drive slider 6 passes through a cam slot 9 which is formed in the support member 3. The tilt pin 62 extends substantially horizontally along the lateral line of the vehicle. A collar 62a is mounted around the tilt pin 62, and received in the cam slot 9. The drive slider 6 further has a sliding shelf 63 projecting from the outer side surface of the drive slider 6, as shown in FIG. 6, and extending from a front end 63a to a rear end 63b along the rail member 4 over the top surface of the rail member 4, as shown in FIG. 10.

Each of the front and rear ends 63a and 63b of the shelf 63 is tapered so that the end surface slopes down to an edge, and the bottom surface of the shelf 63 projects beyond the top surface in the longitudinal direction of the rail member 4. Front and rear upward projections 64 and 65 project upwardly from the top surface of the shelf 63. The front projection 64 is closer to the front end 63a, and the rear projection 65 is closer to the rear end 63b. A retaining member 62b is fixedly mounted on the tilt pin 62. The retaining member 62b is slidably received in the first rail groove 41 and is slidably engaged with the upper flange portion of rail member 4, and the support member 3 is placed between the main portion of the drive slider 6 and the retaining member 62b, as shown in FIG. 6. The retaining member 62b serves for eliminating the looseness of the support member 3. Liners 66 of resin or the like are attached to the sliding surfaces of the lower portion 61, the shelf 63, and the retaining member 62b.

The cam slot 9 receiving the tilt pin 62 of the drive slider 6 is formed in a vertical wall of the front main portion 31 of the support member 3, as shown in FIG. 9. The cam slot 9 extends approximately along the longitudinal line of the vehicle, and includes a front portion 91 and a slant portion 92 extending from the front portion 91 toward the rear of the vehicle. The front portion 91 of the cam slot 9 is substantially parallel to the rail member 4 when the roof lid 1 is in the closed position. The slant portion 92 slopes down from the front portion 91 to a rear end of the slant portion 92 at least when the roof lid 1 is in the closed position.

Figure 11:
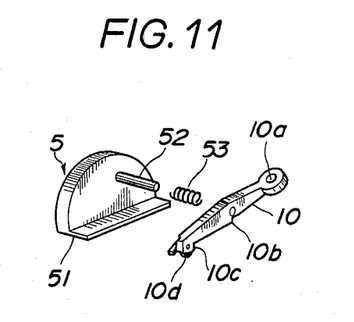
FIG. 11 is a schematic exploded perspective view showing a front slider shown in FIG. 1.

As shown in FIGS. 5 and 11, the front slider 5 has a lower portion 51 slidably received in the second rail groove 42 of the rail member 4. The front slider 5 is connected with a tilt lock member 12 shown in FIGS. 1 and 8, by a rod 13. The front slider 5 and the lock member 12 move together as a unit so that the distance between the front slider 5 and the tilt lock member 12 is constant. The tilt lock member 12 is slidably received in the first rail groove 41. In the state shown in FIG. 1, the tilt lock member 12 is engaged with the rear end 32a of the support member 3 in such a manner as to prevent an upward movement of the rear end 32a. A first lock lever 10 is pivotally mounted on the front slider 5. The front slider 5 has a pivot pin 52 which projects from an outer side surface of the front slider 5 substantially in parallel to the lateral line of the vehicle, and pivotally supports the middle of the first lock lever 10. The first lock lever 10 has a front end in which a downward projection 10c is formed, and a rear end in which a hole 10a for receiving the front upward projection 64 of the drive slider 6. The downward projection 10c has a roller 10d which can roll on the top surface of the rail member 4. The downward projection 10c falls in a first notch 14 formed in the rail member 4 when the front slider 5 is in a predetermined position along the rail member 4. The first lock lever 10 is always urged in the counterclockwise direction in FIG. 1 by a spring 53 mounted on the pivot pin 52. Accordingly, the downward projection 10c is pressed against the top surface of the rail member 4. The first lock lever 10 further has a step 10b formed in the underside of the lever 10. When the drive slider 6 moves forwardly, the front end 63a of the shelf 63 of the drive slider 6 abuts against the step 10b of the first lock lever 10. Therefore, the drive slider 6 can cause the first lock lever 10 to rotate in the clockwise direction in FIG. 1, and lift up the front end of the first lock lever 10 by pushing the step 10b forwardly with the front end 63a. Liners 54 are attached to the sliding surfaces of the lower portion 51 of the front slider 5, and the tilt lock member 12.

Figure 12:
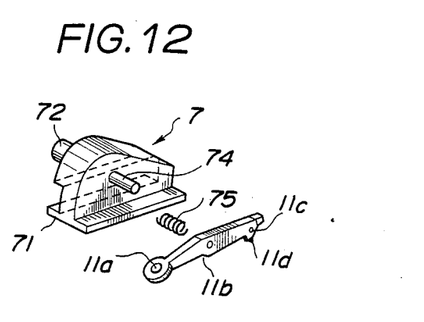
FIG. 12 is a schematic exploded perspective view showing a rear slider shown in FIG. 1.
Figure 13:
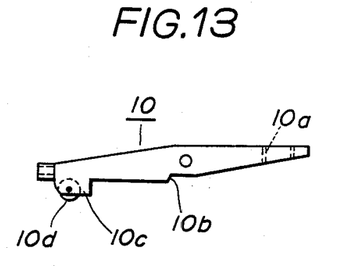
FIG. 13 is an elevation showing a first lock lever shown in FIG. 1.
Figure 14:
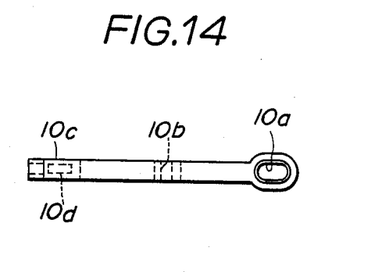
FIG. 14 is a top view of the first lock lever of FIG. 13.

As shown in FIGS. 7 and 12, the rear slider 7 has a lower portion 71 slidably received in the second rail groove 42, and an engaging pin 72 projecting from an inner side surface of the rear slider 7 substantially along the lateral line of the vehicle, and passing through a guide slot 31a formed on the vertical wall of the front portion 31 of the support member 3. A collar 73 is fit over the engaging pin 72 and received in the guide slot 31a. The guide slot 31a extends vertically so that the roof lid 1 can be tilted up. The rear slider 7 further has a pivot pin 74 projecting from an outer side surface of the slider 7. A second lock lever 11 is pivotally supported at the middle on the pivot pin 74. The second lock lever 11 has a front end having a hole 11a for receiving the rear upward projection 65 of the drive slider 6, and a rear end having a downward projection 11c. The downward projection 11c is provided with a roller 11d which can roll on the top surface of the rail member 4. The downward projection 11c is caught in a second notch 15 formed in the rail member 4 when the rear slider 7 is in a predetermined position. A spring 75 is mounted on the pivot pin 74. The second lock lever 11 is urged in the clockwise direction in FIG. 1, and the rear end of the lever 11 is pressed downwardly against the rail member 4. The second lock lever 11 further has a step 11b formed in the underside of the lever 11. The drive slider 6 can cause the second lock lever 11 to rotate in the counterclockwise direction in FIG. 1 and lift up the rear end 11c by pushing the step 11b rearwardly with the rear end 63b of the shelf 63. Liners 76 are attached to the sliding surfaces of the rear slider 7.

Figure 1:
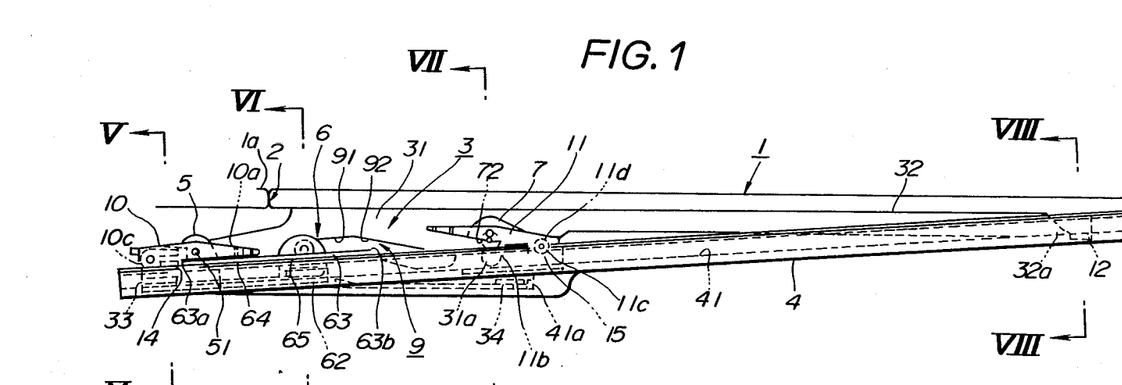
FIG. 1 is a side view showing a main portion of a vehicle roof structure of one emnodiment of the present invention in a state in which a sliding roof lid is placed in a closed position and locked.

The mechanism of this embodiment is operated as follows:

In the closed state shown in FIG. 1, in which the roof opening 2 is completely closed by the lid 1, the tilt pin 62 of the drive slider 6 is in a foremost position in the front portion 91 of the cam slot 9. In this state, the rear end 32a of the rear portion 32 of the support member 3 is locked by the tilt lock member 12 so that the rear end 32a cannot move upward, and the front slider 5 is pushed forwardly by the drive slider 6 to the foremost position. The downward projection 10c of the first lock lever 10 is positioned ahead of the first notch 14, and pressed on the top surface of the rail member 4. The front upward projection 64 of the drive slider 6 is engaged in the hole 10a of the first lock lever 10. The rear sliding portion 34 of the support member 3 falls off from the first rail groove 41 into the recess 41a. The engaging pin 72 of the rear slider 7 is positioned at the upper end of the guide slot 31a of the support member 3, as shown in FIG. 1. The downward projection 11c of the second lock lever 11 is caught in the second notch 15 of the rail member 4. Therefore, the rear slider 7 locks the support member 3 so that the support member 3 cannot slide longitudinally.

Figure 2:
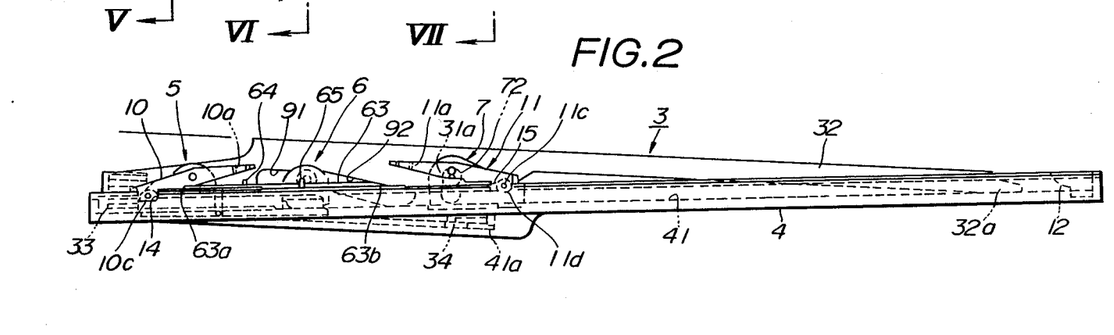
FIG. 2 is a side view showing the roof structure of FIG. 1 in a state in which the lid is still in the closed position but its tilt lock is released.

FIG. 2 shows the state in which the roof lid 1 still remains in the closed position but the front slider 5 is put in a release position. When the drive slider 6 is moved rearwardly from the foremost position shown in FIG. 1, the front slider 5 is pulled rearwardly by the drive slider 6 through the first lock lever 10 whose hole 10a is engaged with the front upward projection 64 of the drive slider 6. Therefore, the tilt lock member 12 is pushed rearwardly through the rod 13, and separated from the rear end 32a of the support member 3. When the front slider 5 reaches the position shown in FIG. 2, the downward projection 10c of the fist lock lever 10 falls into the first notch 14 of the rail member 4, so that the first lock lever 10 is disengaged from the front upward projection 64 of the drive slider 6. On the other hand, the rear slider 7 remains in the lock position in which the downward projection 11c of the second lock lever 11 is caught in the second notch 15 of the rail member 4. Therefore, in the state of FIG. 2, the support member 3 is still locked as to the sliding movement while the support member 3 is unlocked as to the tilting movement.

Figure 3:
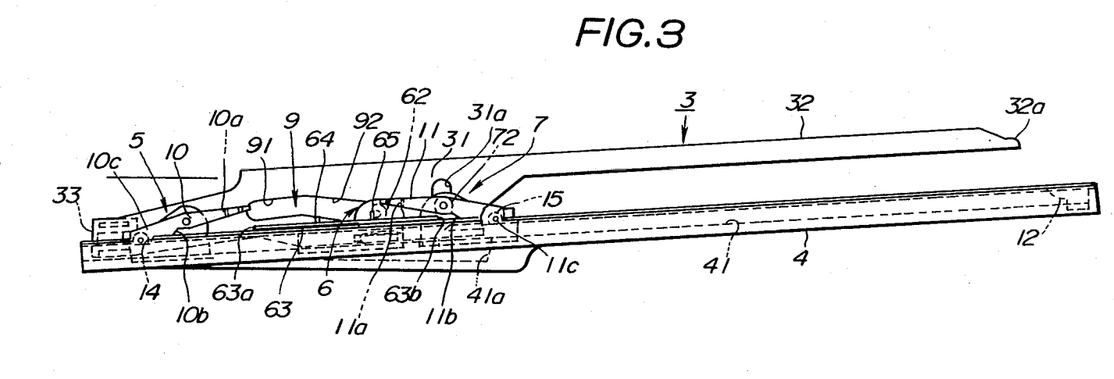
FIG. 3 is a side view showing the roof structure of FIG. 1 in a state in which the roof lid is tilted up.

With a further rearward movement of the drive slider 6 from the position shown in FIG. 2, the tilt pin 62 of the drive slider 6 moves along the slant portion 92 of the cam slot 9 of the support member 3, and causes the support member 3 to rotate about the front sliding portion 33, as shown in FIG. 3. Thus, the roof lid 1 is tilted up. When the tilt pin 62 of the drive slider 6 reaches a predetermined rear position of the cam slot 9, the rear end 63b of the shelf 63 of the drive slider 6 bumps against the step 11b of the second lock lever 11 of the rear slider 7. Then, the drive slider 6 causes the second lock lever 11 to rotate in the counterclockwise direction in FIG. 3 by pushing the step 11b of the lever 11 rearwardly with the rear end 63b. Therefore, the downward projection 11c of the second lock lever 11 is extracted from the second notch 15, and the support member 3 is unlocked in the sliding direction. At the same time, the hole 11a of the front end of the second lock lever 11 becomes engaged with the rear upward projection 65 of the drive slider 6.

Figure 4:
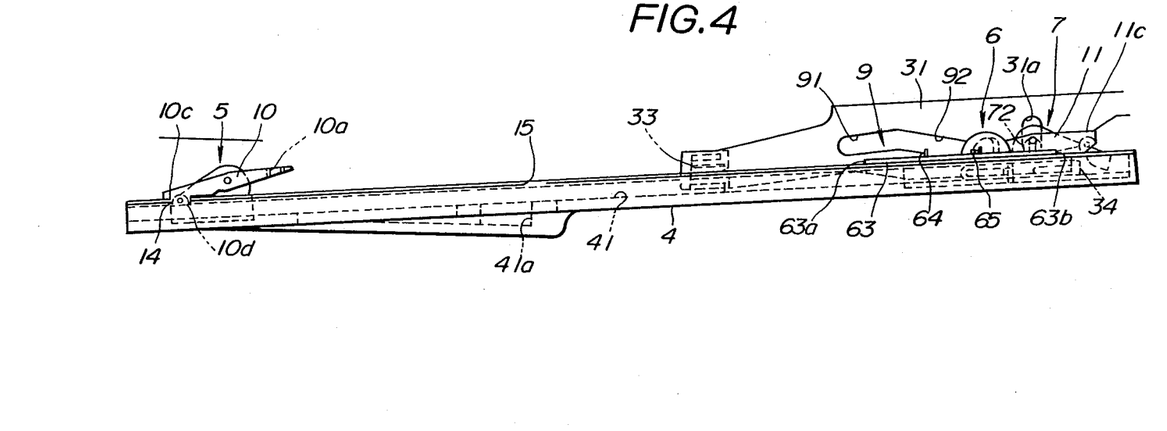
FIG. 4 is a side view showing the roof structure of FIG. 1 in a state in which the lid is fully opened.

Then, the rear face of the drive slider 6 abuts on the front face of the rear slider 7, and the drive slider 6 pushes the support member 3 rearwardly through the rear slider 7, as shown in FIG. 4. Thus, the roof lid 1 is moved rearwardly over the roof, and the roof opening 2 is opened.

The rail member 4 of this embodiment is inclined so that the rail member 4 slopes upwards toward the rear of the vehicle. The inclination of the rail member 4 contributes to preventing interference between the roof lid 1 and the roof frame 1a.

In this embodiment, the operation for tilting the roof lid 1 is performed by the cam slot 9 and the tilt pin 62. Therefore, the tilting operation is smooth and reliable, and the rigidity of the supporting structure is high even during the tilting operation. Furthermore, the backlash in the mechanism is reduced.

The roof lid 1 is closed in the following manner.

When the drive slider 6 is moved forwardly through the wire 8 from the position shown in FIG. 4, the rear end 63b of the shelf 63 of the drive slider 6 moves away from the step 11b of the second lock lever 11, and the roller 11d of the rear end 11c of the second lock lever 11 descends onto the top surface of the rail member 4. During a further forward movement, the drive slider 6 pulls the rear slider 7 forwardly with the rear upward projection 65 engaging with the hole 11a of the second lock lever 11, and the support member 3 is also pulled forwardly through the engaging pin 72 of the rear slider 7 which is engaged in the guide slot 31a of the support member 3.

When the drive slider 6 reaches the position shown in FIG. 3, the downward projection 11c of the second lock lever 11 is caught in the second notch 15 of the rail member 4. Accordingly the front end of the second lock lever 11 moves away from the rear upward projection 65 of the drive slider 6, so that the drive slider 6 and the rear slider 7 are disconnected from each other. In this state, the roof lid 1 is locked by the second lock lever 11 of the rear slider 11 in the sliding direction.

When the drive slider 6 is moved further toward the front, the tilt pin 62 of the drive slider 6 causes the support member 3 to tilt down by sliding along the slant portion 92 of the cam slot 9. The rear sliding portion 34 of the support member 3 is lowered into the recess 41a below the first rail groove 41, and the rear end 32a of the support member 3 is lowered into the first rail groove 41, as shown in FIG. 2.

When the drive slider 6 is moved forwardly from the position shown in FIG. 2, the front end 63a of the shelf 63 of the drive slider 6 abuts on the step 10b of the first lock lever 10, and the downward projection 10c of the front end of the first lock lever 10 is lifted up from the first notch 14 of the rail member 4. At the same time, the hole 10a of the first lock lever 10 is engaged with the front upward projection 63 of the drive slider 6. Then, the drive slider 6 pushes the tilt lock slider 5 forwardly, and causes the tilt lock member 12 to move forwardly together with the front slider 5 through the rod 13 until the rear end 32a of the support member 3 is locked by the tilt lock member 12.

Figure 15:
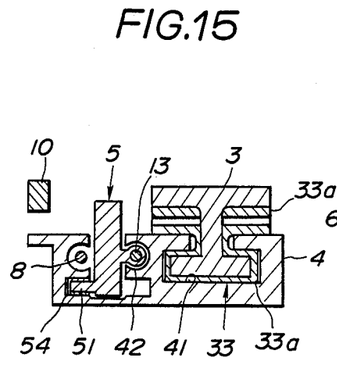
FIG. 15 is a sectional view taken across the line V—V of FIG. 1, for showing a modification in which the support member is fabricated by die casting.
Figure 16:
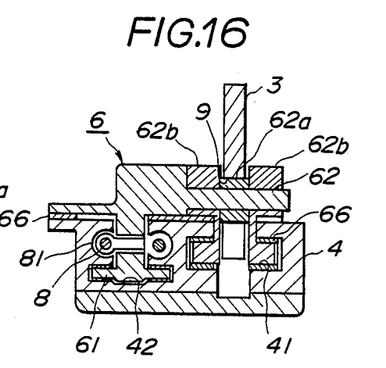
FIG. 16 is a sectional view taken across the line VI—VI of FIG. 1, for showing the modifiction of FIG. 15 using the die-cast support member.

In this embodiment, the support member 3 is fabricated by press forming. However, the support member 3 may be fabricated by die casting as shown in FIGS. 15 and 16.

What is claimed is:

1. A vehicle sliding roof structure comprising:
   a roof having an opening;
   a sliding roof lid for closing said opening in a closed position and opening said opening in an open position;
   a rail member adapted to be fixed to said roof;
   a support member supporting said lid and slidably mounted on said rail member so that said lid can be tilted up into a tilted posture in which a rear end of said roof lid is lifted up from said closed position and slid in said tilted posture along said rail member to said open position;
   drive slider means slidably mounted on said rail member for tilting and sliding said lid; and
   cam means comprising a cam slot formed in said support member, and translating means formed in said drive slider and slidably received in said cam slot for causing said support member to tilt with respect to said rail member by sliding along said cam slot when said translating means is moved along said rail member with said drive slider, wherein said rail member has a first rail groove extending along said rail member and a recess depressed below said first rail groove, and wherein said support member has a front main portion which supports an underside of a front portion of said lid and formed with said cam slot and a rear extension extending from said front main portion to a rear end of said support member, said front main portion of said support member having a front sliding portion slidably received in said first rail groove of said rail member, and a rear sliding portion slidably received in said first rail groove when said support member slides along said rail member, said rear sliding portion being sunk in said recess and said rear end of said support member being received in said first rail groove when said support member is in said closed position.

2. A structure according to claim 1 wherein said cam slot is formed in a vertical wall of said support member which is substantially parallel to said rail member, and has a slant portion which is inclined with respect to said rail member when said support member is in said closed position, and said translating means comprises a tilt pin projecting from said drive slider substantially at right angles to said vertical wall through said cam slot.

3. A structure according to claim 2 wherein said rail member extends substantially along a longitudinal axis of the vehicle, and said slant portion of said cam slot slopes down from a front end to a rear end of said support member when said support member is in said closed position.

4. A structure according to claim 1 wherein said structure further comprises first lock means for preventing said support member from tilting away from said closed position when said first lock means is in a first lock position, and second lock means for preventing said support member from sliding along said rail member when said second lock means is in a second lock position, said first lock means being moved by said drive slider from said first lock position to a first release position to allow a tilting movement of said support member when said drive slider moves from a first position to a second position along said rail member toward a rear end of said rail member, said support member being tilted by said translating means of said drive slider when said drive slider moves from said second position to a range of third positions along said rail member toward said rear end of said rail member, said second lock means being moved by said drive slider from said second lock position to a second release position to allow a sliding movement of said support member when said drive slider moves from said third positions along said rail member toward said rear end of said rail member.

5. A structure according to claim 4 wherein said cam slot of said support member has a front portion which is substantially parallel to said rail member when said support member is in said closed position.

6. A vehicle roof sliding structure comprising:
   a roof having an opening;
   a sliding roof lid for closing said opening in a closed position and opening said opening in an open position;
   a rail member adapted to be fixed to said roof;
   a support member supporting said lid and slidably mounted on said rail member so that said lid can be tilted up to into a tilted posture in which a rear end of said roof lid is lifted up from said closed position and slid in said tilted posture along said rail member to said open position;
   drive slider means slidably mounted on said rail member for tilting and sliding said lid;
   cam means comprising a cam slot formed in said support member, and translating means formed in said drive slider and slidably received in said cam slot for causing said support member to tilt with respect to said rail member by sliding along said cam slot when said translating means is moved along said rail member with said drive slider;
   said cam slot is formed in a vertical wall of said support member which is substantially parallel to said rail member, and has a slant portion which is inclined with respect to said rail member when said support member is in said closed position, and said translating means comprises a tilt pin projecting from said drive slider substantially at right angles to said vertical wall through said cam slot;

said rail member extends substantially along a longitudinal axis of the vehicle, and said slant portion of said cam slot slopes down from a front end to a rear end of said support member when said support member is in said closed position;

said structure further comprises first lock means for preventing said support member from tilting away from said closed position when said first lock means is in a first lock position, and second lock means for preventing said support member from sliding along said rail member when said second lock means is in a second lock position, said first lock means being moved by said drive slider from said first lock position to a first release position to allow a tilting movement of said support member when said drive slider moves from a first position to a second position along said rail member toward a rear end of said rail member, said support member being tilted by said translating means of said drive slider when said drive slider moves from said second position to a a range of third positions along said rail member toward said rear end of said rail member, said second lock means being moved by said drive slider from said second lock position to a second release position to allow a sliding movement of said support member when said drive slider moves from said third positions along said rail member toward said rear end of said rail member;

said cam slot of said support member has a fourth portion which extends from the front end of said slant portion toward a front of the vehicle, and is substantially parallel to said rail member when said support member is in said closed position; and said rail member has a first rail groove extending along said rail member and a recess depressed below said first rail groove, and wherein said support member has a front main portion which supports an underside of a front portion of said lid and formed with said cam slot, and a rear extension extending from said front main portion to a rear end of said support member toward a rear end of said lid, said front main portion of said support member having a front sliding portion slidably received in said first rail groove of said rail member, and a rear sliding portion slidably received in said first rail groove when said support member slides along said rail member, said rear sliding portion being sunk in said recess and said rear end of said support member being received in said first rail groove when said support member is in said closed position.

7. A structure according to claim 6 wherein said rail member has a second rail groove which is parallel to said first rail groove, and in which said drive slider is slidably received, and wherein said first lock means comprises a front slider which is slidably received in said second rail groove in front of said drive slider and which is engaged with said drive slider when said drive slider is closer to a front end of said rail member than said second position, and disengaged from said drive slider when said drive slider is closer to said rear end of said rail member than said second position, and said second lock means comprises a rear slider which is slidably received in said second rail member in rear of said drive slider and which is engaged with said drive slider when said drive slider is rearward of said third positions.

8. A structure according to claim 7 wherein said first lock means further comprises a tilt lock member which is connected with said front slider by a rod so that said tilt lock member and said front slider move together along said rail member and which is slidably received in said first rail grove, said tilt lock member being engaged with said rear end of said support member to prevent the tilting movement of said support member when said support member is in said closed position and at the same time said first lock means is in said first lock position.

9. A structure according to claim 8 wherein said first lock means further comprises a first lock lever which is swingably mounted on said front slider and urged by a spring in such a rotational direction that a front end of said first lock lever is pressed downwardly on an upper surface of said rail member and a rear end of said first lock lever is raised, said front end of said first lock lever being placed on said upper surface of said rail member in front of a first notch formed in said rail member and said rear end of said first lock lever being engaged with said drive slider when said first lock means is in said first lock position, said front end of said first lock lever being sunk in said first notch and said rear end of said first lock lever being raised and disengaged from said drive slider when said first lock means is in said first release position, said first lock lever being formed with a lower portion so that a front end of said drive slider can raise said front end of said first lock lever and lower said rear end of said first lock lever by pushing said lower portion forwardly.

10. A structure according to claim 9 wherein said second lock means further comprises a second lock lever which is swingably mounted on said rear slider and urged by a spring in such a rotational direction that a front end of said second lock lever is raised and a rear end of said second lock lever is pressed downwardly on said upper surface of said rail member, said rear end of said second lock lever being sunk in a second notch formed in said rail member so that said rear slider is immovable along said rail member when said second lock means is in said second lock position, said second lock lever being formed with a lower portion such that said drive slider can raise said rear end of said second lock lever from said second notch and lower said front end of said second lock lever by pushing said lower portion of said second lock lever rearwardly with a rear end of said drive slider.

11. A structure according to claim 10 wherein said rear slider has an engaging pin, and said front main portion of said support member is formed with a guide slot which receives said engaging pin of said rear slider and which is elongated vertically so as to permit the tilting movement of said support member.

12. A structure according to claim 11 wherein said first lock lever has a roller mounted on said front end of said first lock lever for rolling on said upper surface of said rail member, and a hole which is formed in said rear end of said first lock lever for engaging with a front upward projection formed in said drive slider, and said second lock lever has a roller mounted on said rear end of said second lock lever, and a hole which is formed in said front end of said second lock lever for engaging with a rear upward projection formed in said drive slider.

13. A structure according to claim 12 wherein said rail member is inclined so that said rail member slopes upwards from said front end to said rear end of said rail member.

14. A structure according to claim 3 wherein said rail member has an upper rail flange extending along said rail member vertically delimiting said first rail groove, said front sliding portion of said support member has a lower sliding flange slidably received in said first rail groove under said upper rail flange, and an upper sliding flange extending over said upper rail flange so that said first sliding portion can be prevented from falling in said recess of said rail member, said rear sliding portion has a lower sliding flange slidably received in said first rail groove.

15. A structure according to claim 14 wherein said rail member has a second rail groove which is parallel to said first rail groove, and said drive slider comprises a main portion slidably received in said second rail groove and a retaining member which is fixedly mounted on said tilt pin so that said vertical wall of said support member having said cam slot is placed between said main portion and said retaining member, said retaining member being slidably received in said first rail groove and slidably engaged with said upper rail flange. The rail member has a first rail groove extending along the rail member and a recess depressed below the first rail groove. The support member has a front main portion which is fixed to an underside of a front portion of the lid and formed with the cam slot, and a rear extension extending from the front main portion to a rear end of the support member toward a rear end of the lid. The front main portion of the support member having a front sliding portion slidably received in the first rail groove of the rail member, and a rear sliding portion slidably received in the first rail groove when the support member slides along the rail member. The rear sliding portion being sunk in the recess and the rear end of the support member being received in the first rail groove when the support member is in the closed position.

* * * * *